United States Patent [19]
Melen

[11] Patent Number: 6,160,909
[45] Date of Patent: Dec. 12, 2000

[54] DEPTH CONTROL FOR STEREOSCOPIC IMAGES

[75] Inventor: Roger D. Melen, Los Altos Hills, Calif.

[73] Assignee: Canon Kabushiki Kaisha, Tokyo, Japan

[21] Appl. No.: 09/053,191

[22] Filed: Apr. 1, 1998

[51] Int. Cl.$^7$ ..................................................... G06K 9/00
[52] U.S. Cl. ........................... 382/154; 345/419; 345/427; 345/438; 382/276
[58] Field of Search ..................... 345/419, 427, 345/438; 382/154, 276, 293; 348/295, 291

[56] References Cited

U.S. PATENT DOCUMENTS

| | | | |
|---|---|---|---|
| 3,769,889 | 11/1973 | Wechsler | 95/18 P |
| 3,883,251 | 5/1975 | Helava | 356/203 |
| 4,650,282 | 3/1987 | Lo | 350/130 |
| 5,249,035 | 9/1993 | Yamanaka | 356/376 |
| 5,347,363 | 9/1994 | Yamanaka | 356/376 |
| 5,390,024 | 2/1995 | Wright | 356/376 |
| 5,432,712 | 7/1995 | Chan | 364/514 R |
| 5,455,689 | 10/1995 | Taylor et al. | 358/450 |
| 5,475,422 | 12/1995 | Mori et al. | 348/48 |
| 5,495,576 | 2/1996 | Ritchey | 395/125 |
| 5,510,831 | 4/1996 | Mayhew | 348/47 |
| 5,644,651 | 7/1997 | Cox et al. | 382/154 |
| 5,655,033 | 8/1997 | Inoguchi et al. | 382/293 |
| 5,680,474 | 10/1997 | Lijima et al. | 382/154 |

OTHER PUBLICATIONS

Zhizhuo, W., "From Photogrammetry to Geomatics—a Commemoration of the Accomplishment that is VirtuoZo", The VirtuoZo Manuscript, http://www.squirrel.com.au/virtuozo/Manuscript/wang.html, Dec. 18, 1997.

Roux, M., "Cartography Updating", http://www-ima.en-st.fr/activite$_{13}$96/en/node42.html, Mar. 24, 1998.

Dupéret. A., "Automatic Derivation of a DTM to Produce Countour Lines", http://dgrwww.epfl.ch/PHOT/publicat/wks96/Art__3__2.html, Mar. 24, 1998.

*Primary Examiner*—Richard A. Hjerpe
*Assistant Examiner*—Philip H. Stevenson
*Attorney, Agent, or Firm*—Fenwick & West LLP

[57] ABSTRACT

The apparent depth (416) of an apparent point (404) in a set of stereoscopic images (300) is altered by moving a region (502) in at least one image (300) which corresponds to the apparent point (404). The location of the regions (502) within each image (300) representing the apparent point (404), together with the geometry of the vantage point (306) locations, specifies the depth (316) of an actual point (304) in a scene. The region (502) corresponding to the apparent point (404) in one of the images (300) is then moved to another location in the image (300), in order to produce another set of images (300) in which the apparent depth (416) of the apparent point (404) has been altered. In other embodiments, portions of both images (300) are moved, to place the apparent point (404) at a desired location both in terms of apparent depth (416) and apparent epipolar location (314). The determination of the new apparent depth (416) for the apparent point (404) may be based on the initial apparent depth (416), or may be unrelated to the initial apparent depth (416). The new apparent depth (416) for the apparent point (404) may be selected by the user of a computer program carrying out the method. The set of stereoscopic images (300) may be still images or moving images, and may be captured digitally, scanned from photographs, or computer-generated.

20 Claims, 5 Drawing Sheets

DEPTH CONTROL FOR STEREOSCOPIC IMAGES

FIELD OF INVENTION

This invention pertains to the field of stereoscopic image manipulation. More specifically, this invention pertains to computer implemented alteration of depth information in a set of stereoscopic images.

BACKGROUND OF THE INVENTION

Stereoscopic photography has been practiced since almost the beginning of photography itself. Early stereoscopic viewers allowed users to view scenic locations with a realism lacking in ordinary photography. Modern versions of stereoscopic viewers, such as the View-Master, produced by Tyco Toys, have long been staples of the toy industry. Advances in technology have produced such variations as "3-D" movies and, more recently, "virtual reality," or computer generated interactive stereoscopic simulations. As real-time stereoscopic viewers are beginning to find uses in such areas as the medical field, it is apparent that stereoscopic viewing is becoming more common.

The optical phenomenon exploited by the brain to extract depth information from a three dimensional scene is known as "parallax." As shown in FIG. 1, a person with two functional eyes 402 viewing point 304 sees slightly different images in each eye 402, due to the slightly different angle from each eye 402 to point 304. The apparent location of point 304 is different for each eye 402. By analyzing the differences due to parallax, the brain is able to determine the distance to point 304. By photographing, or otherwise recording, a scene from two distinct locations which mimic the location of eyes 402, as illustrated in FIG. 2, a set of images can be generated which, when viewed properly, can recreate the parallax of the original scene, giving the illusion of three dimensions in the two dimensional images. Each camera 202 uses lens 204 to project an image of point 304 onto image plane 308. As illustrated in FIGS. 3a and 3b, each image point 302 of images 300a and 300b represents a point 304 in a three dimensional scene. Each image 300 is associated with a "vantage point" 306, which is the location of the point of view of that image 300. Each image point 302 corresponds to the intersection of an image plane 308 with a "view line" 310. A view line 310 passes through a vantage point 306 and the point 304 in the scene which is represented by image point 302. The view line 310 which passes through vantage point 306 and intersects image plane 308 perpendicularly defines a "center point" 312 in the image 300 associated with the vantage point 306.

A set of two or more images 300 is "stereoscopic" if they represent substantially parallel views of substantially the same scene, with the vantage points 306 of the images 300 being separated in a direction substantially perpendicular to the direction of the views, this perpendicular direction defining the "epipolar" axis 314.

As illustrated in FIG. 4, when stereoscopic images 300 are viewed with eyes 402 taking the place of vantage points 306 relative to images 300, the viewer perceives apparent points 404 where points 304 had been.

There are a number of reasons one might wish to change the apparent depth 416 of at least some of the apparent points 404 in a set of stereoscopic images 300. Some viewers of images 300 may experience vertigo or nausea due to extremes in the apparent depth 416 of apparent points 404 and need to have the apparent depth 416 moderated. Others may aesthetically prefer the sensation of extremes in depth, and may wish to have the apparent depth 416 in a set of stereoscopic images 300 augmented. Still others may wish to create a new scene in which particular apparent points 404 are brought forward to focus attention on them.

The apparent depth 416 of apparent points 404 in a stereoscopic set of images 300 is controlled by three factors: 1) the actual depth 316 of points 304 represented, 2) the ratio of distance 420 between each of the viewer's eyes 402 to distance 320 between vantage points 306a and 306b, and 3) the ratio of distance 318 between vantage points 306 and image plane 308 and distance 418 between the viewer's eyes 402 and images 300.

After images 300 have been recorded or created, only the third factor can conventionally be changed, by changing distance 418 between the viewer's eyes 402 and images 300. By changing this distance, the apparent depth 416 of all points 404 in the scene can be altered. Doing this, however, is often impossible or inconvenient, since the viewing apparatus may not allow for altering distance 418. Also, changing distance 418 without changing the magnification alters the apparent distance between points 404 in the scene, as well as the apparent field of view. Changing the magnification of images to account for the changes due to changes in distance 418 negates the changes to apparent depth 416. Finally, changing distance 418 does not allow the apparent depth 416 of points 404 to be individually changed on a point-by-point basis.

What is needed is a system and method for modifying the apparent depth of points 404 in a set of stereoscopic images 300 in a way which does not affect the apparent depth 416 of other points 404, and which does not require alteration of distance 418.

SUMMARY OF THE INVENTION

In one embodiment, the present invention comprises a method for altering the apparent depth (416) of an apparent point (404) in a set of stereoscopic images (300). A region (502) in each image (300) which represents at least the apparent point (404) is identified. The locations of these regions (502) within the images (300), together with the geometry of the vantage point (306) locations associated with the images (300), specify the apparent depth (416) of the apparent point (404) in the scene. The region (502) representing the apparent point (404) in one of the images (300) is translated in the direction of the epipolar axis (314) to another location in that image (300), in order to produce a second set of stereoscopic images (300) in which the apparent depth (416) of the apparent point (404) has been changed. In other embodiments, portions (502) of both images (300) are moved to place the apparent point (404) at a desired location both in terms of apparent depth (416) and in terms of apparent epipolar location (314). In still other embodiments, the movement of the regions (502) is not limited to translations along the epipolar axis (314).

The determination of the new apparent depth (416) for the apparent point (404) may be based on the initial apparent depth (416), or may be unrelated to the initial apparent depth (416). The new apparent depth (416) for the apparent point (404) may be selected by the user of a computer program carrying out the method. The set of stereoscopic images (300) may be still images or moving images, and they may be captured digitally, scanned from photographs, or computer-generated.

BRIEF DESCRIPTION OF THE DRAWINGS

FIG. 3b is an illustration of two images 300a and 300b resulting from the geometry of FIG. 3a.

DETAILED DESCRIPTION OF THE PREFERRED EMBODIMENTS

Figure 5:
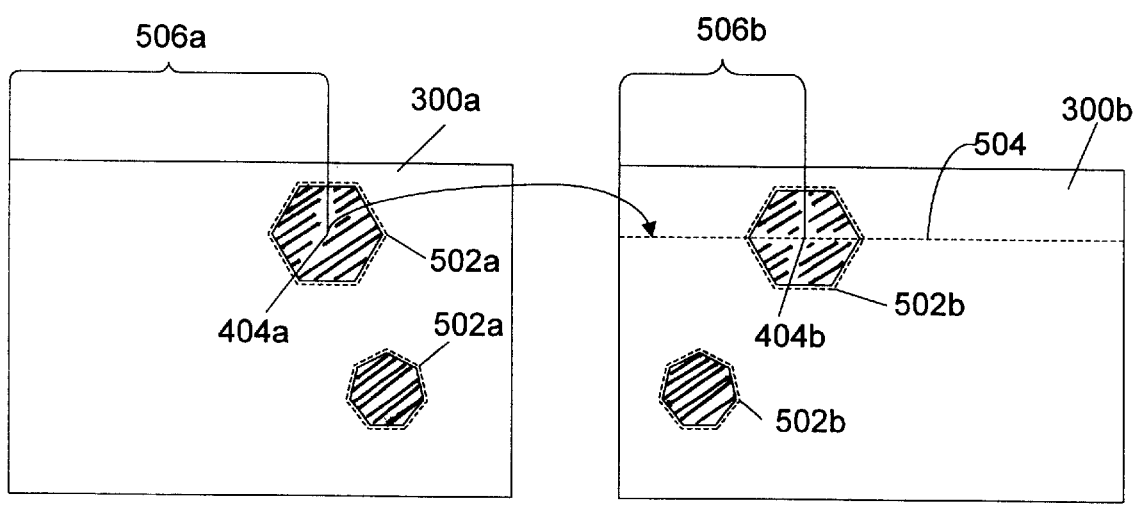
FIG. 5 is an illustration of a stereoscopic set of images 300a and 300b which contain points 404 which are bounded by areas 502.
Figure 6:
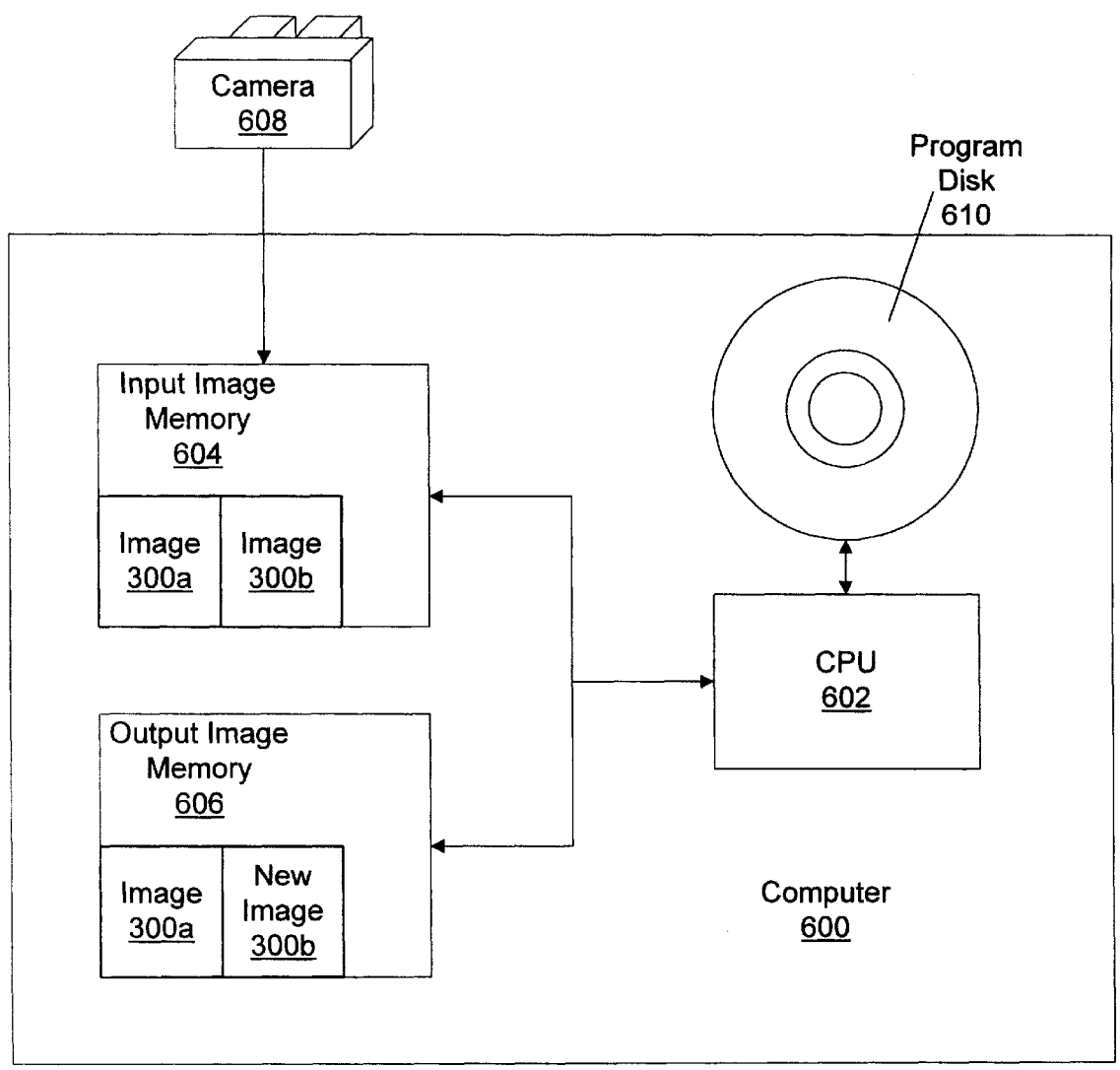
FIG. 6 is an illustration of one embodiment of the invention.

Referring now to FIGS. 5 and 6, an embodiment of the present invention is described. A camera 608 with two imaging systems is used to capture a stereoscopic set of images 300 based on a real world scene. This camera 608 may either capture images 300 in digital form, or analog versions of images 300 may be scanned at a later time to produce digital images 300. In other embodiments images 300 are computer generated images based on a computer model of a three dimensional scene. Images 300 can also be moving images representing either a real world scene or a computer model. Images 300 are stored in digital form in input image memory 604, where they are accessible to central processing unit (CPU) 602. CPU 602 responds to program instructions stored on a computer readable medium, such as program disk 610. In the embodiment illustrated in FIG. 6, input image memory 604, CPU 602, and program disk 610 reside in computer 600. In other embodiments, some of these elements can be incorporated in camera 608.

Responding to the instructions of the program on disk 610, CPU 602 operates on stereoscopic images 300a, and 300b, which each represent at least one apparent point 404 in common. Each image 300a and 300b is examined to determine regions 502 in each image 300. Each region 502a in image 300a represents at least one apparent point 404 which is also represented by a corresponding region 502b in image 300b. There are a number of possible approaches to determining corresponding regions 502. Both object-based and non-object-based types of approaches are described, although other approaches can be employed by alternate embodiments of the present invention.

One object-based method for determining corresponding regions 502 is to use standard edge-detection methods to find objects represented in each image 300. The image of an object in one image 300 will likely represent many of the same apparent points 404 as an image of the same object in the other image 300. Edge-detection methods generally analyze small patches of an image to determine contrast. Areas of each image 300 with high contrast are assumed to represent edges of objects. The gradients of contrast in the small patches indicate the direction perpendicular to the object edge. An area of each image 300 which is generally circumscribed by detected edges, and is generally devoid of detected edges on the interior, is assumed to be an area 502 representing an object. In FIG. 5, shaded objects are indicated as being enclosed in regions 502. Less sophisticated object-based methods may be utilized in appropriate circumstances. For example, if each image 300 contains only dark objects against a light background, a luminance threshold may be used to characterize every pixel as either an object pixel or a background pixel. In that case all contiguous object pixels are determined to constitute an area 502 representing a single object.

After regions 502 which represent objects have been identified in each image 300, it is necessary to match detected objects in image 300a to objects in image 300b. This task is simplified by the geometry of the stereoscopic set-up when the views are substantially parallel. For parallel views, an apparent point 404 will appear in both images 300 at the same vertical location, where vertical is the direction within image plane 308 which is perpendicular to the epipolar direction. This vertical location is indicated by epipolar line 504 in FIG. 5. If the views are almost parallel, epipolar line 504 along which point 404b may appear in image 300b, given the location of matching point 404a in image 300a, is nearly horizontal. Given accurate information about the alignment of the system used to create images 300, epipolar line 504 is easily calculated, which greatly simplifies the task of matching points 404. Without accurate alignment information, regions 502 from a larger set of vertical locations in image 300b must be considered as possible matches for a given region 502a in image 300a.

Several techniques can be employed to match regions 502 which have been identified using one of the object-based methods. In one embodiment, the width, height and mean color of target region 502a in image 300a are compared to the width, height and mean color of each region 502b located near the corresponding epipolar line 504 in image 300b. The region 502b which most nearly resembles the target region 502a is considered the match. More sophisticated methods may also be employed. For example, each element of a two-dimensional Fourier transform of one region 502a is multiplied by the complex conjugate of each corresponding element of a two-dimensional Fourier transform of another region 502b, resulting in a Fourier transform of a cross-correlation. Applying an inverse two dimensional Fourier transform results in a cross-correlation, the magnitude of which can be used to determine the degree of fit between the two regions 502. Other transforms may also be used in performing cross-correlations, which are useful for determining the best match given a number of possible matches.

Figure 1:
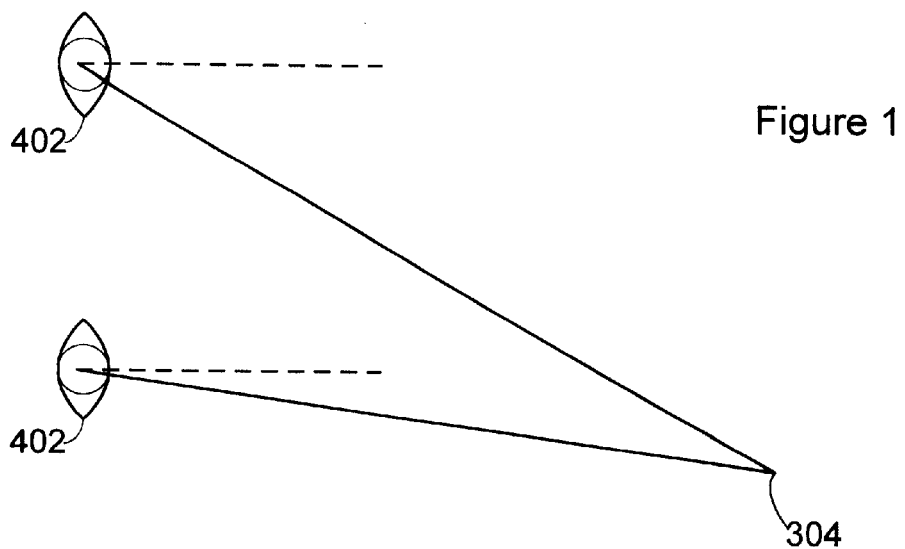
FIG. 1 is an illustration of a pair of eyes 402 viewing a point 304.
Figure 2:
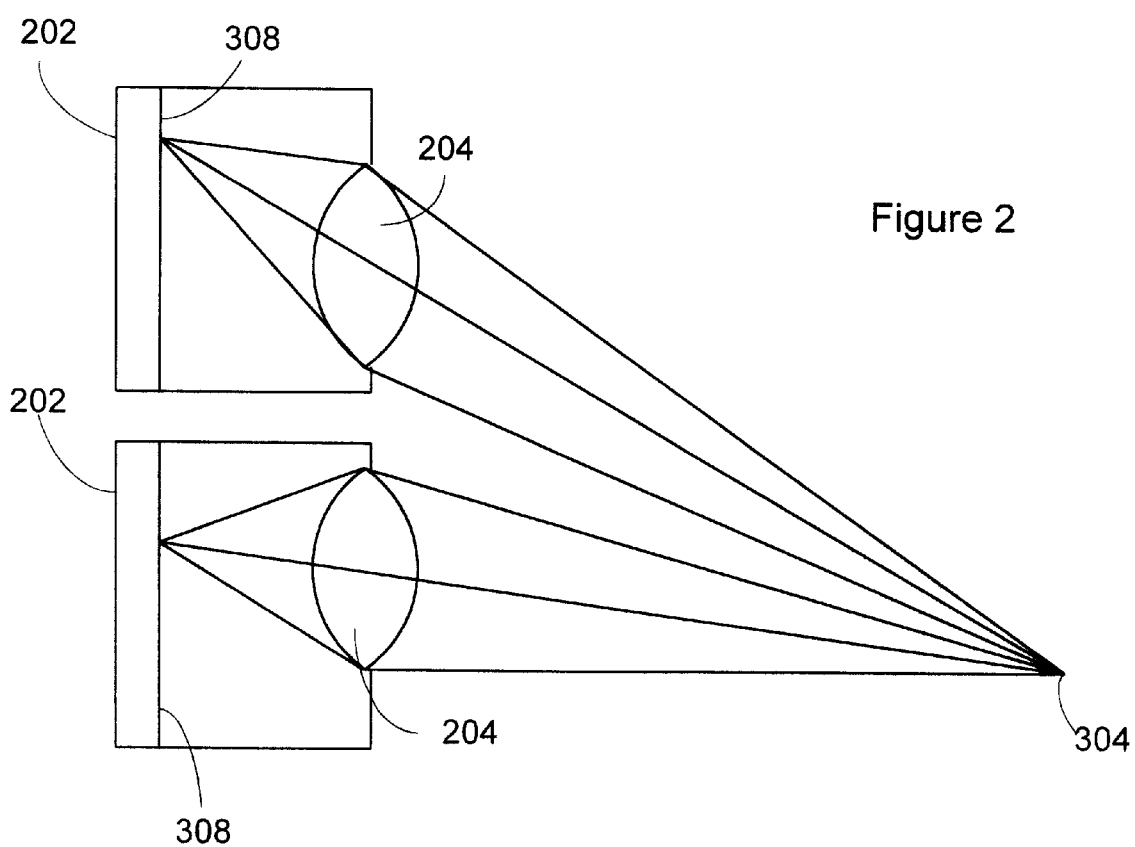
FIG. 2 is an illustration of two cameras producing a stereoscopic set of images 300 of a point 304.
Figure 3A:
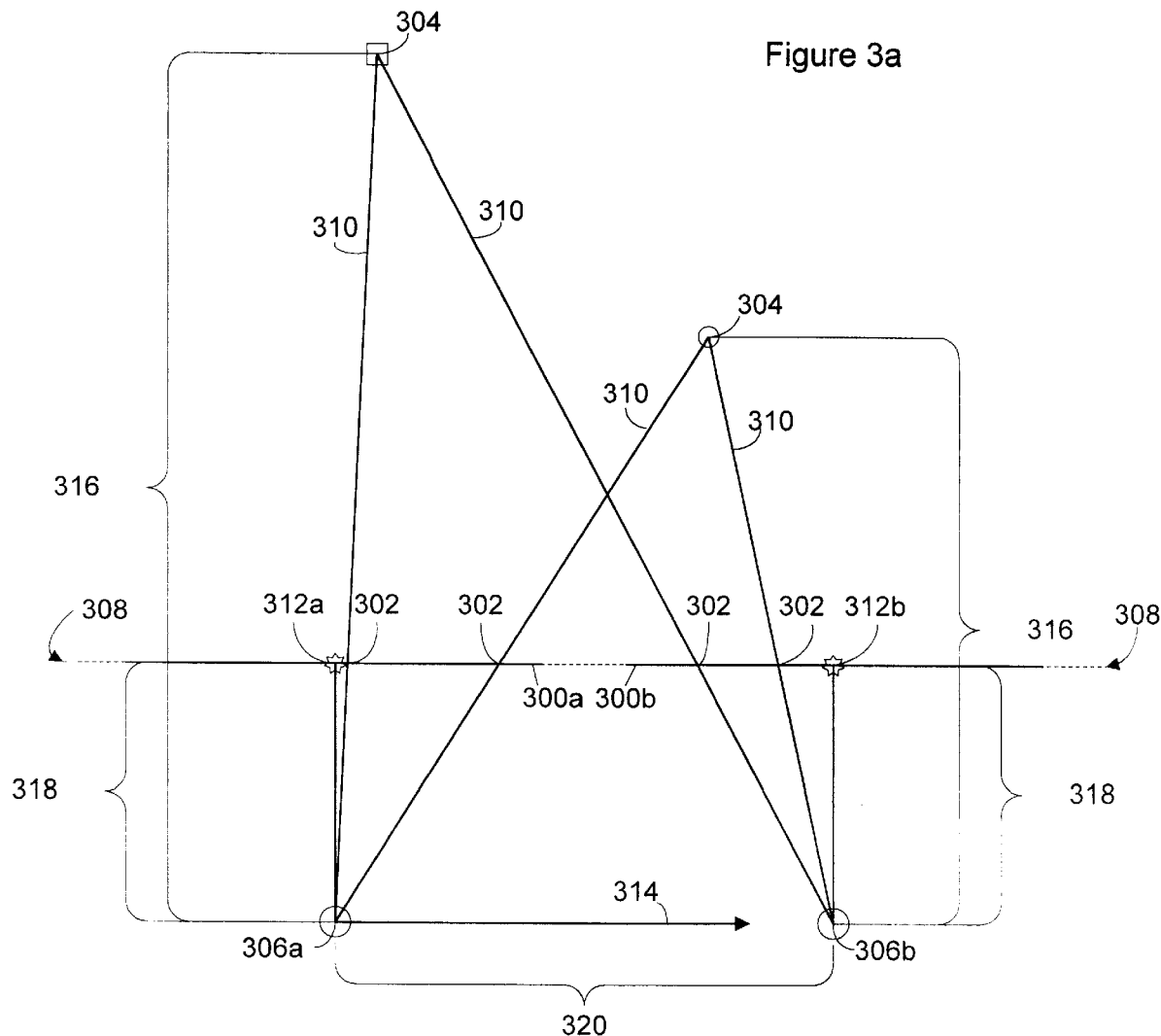
FIG. 3a is a planar view of the geometry involved in creating stereoscopic images 300.
Figure 3B:
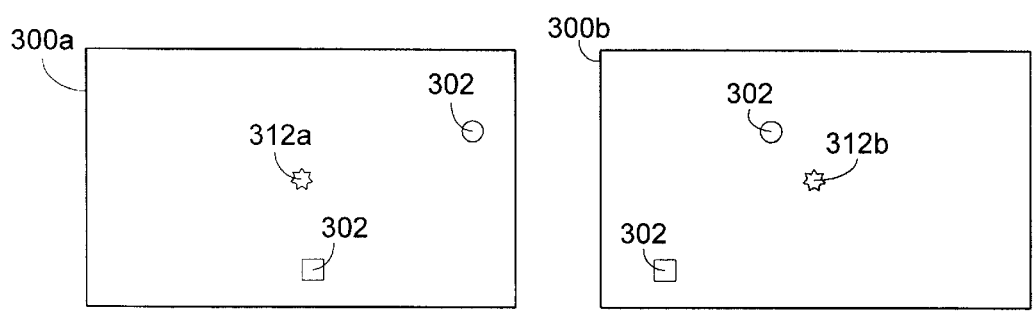
Figure 4:
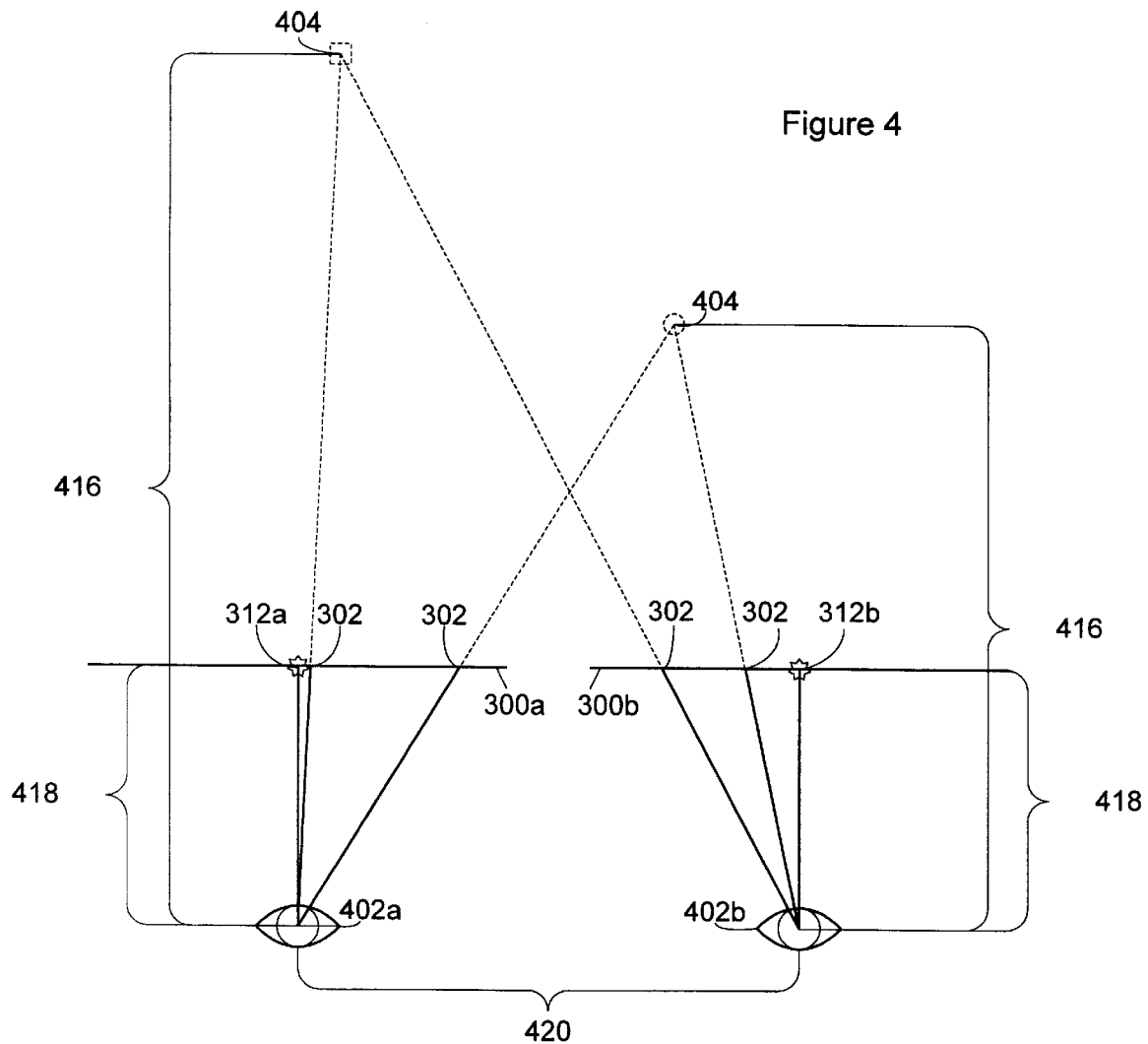
FIG. 4 is a planar view of a pair of eyes 402 viewing a stereoscopic set of images 300.

After regions 502a in image 300a have been matched up with regions 502b in image 300b, the epipolar offset of each region 502a is determined. The epipolar offset is the difference between the location of region 502a in image 300a and the location of matching region 502b in image 300b. To determine the epipolar offset of a region 502 in two or more images 300, it is necessary to have a "characteristic" point in each image 300 from which to measure the location of regions 502 within that image 300. The preferred characteristic point is the upper left corner of each image 300. Another possible characteristic point is center point 312, which represents the intersection with the image plane 308 of that view line 310 which is perpendicular to image plane 308, as illustrated in FIG. 3a. A point 304 located an infinite distance in front of image plane 308 would appear at center point 312 in both images 300.

Non-object-based methods of determining regions 502 and epipolar offsets can also be used. In one such embodiment of the present invention, small areas of image 300a are compared to small areas of image 300b which are located on epipolar lines 504 which correspond to the small areas of image 300a. Correlation techniques like those described above can be used to determine which small area in image 300b corresponds to each small area in image 300a. The small areas can be determined by applying a grid to each image 300. The small areas can be, at the limit, as small as one pixel each. In cases where areas as small as one pixel are used, however, the correlation techniques should take into account areas surrounding the pixel.

Having matched small areas in two images 300, the epipolar offset for each small area is easily determined. In one approach each small area is considered an independent region 502. In another approach the collection of all small areas which share a common epipolar offset may be considered to constitute a single region 502. In the second case regions 502 may be abnormally shaped, and may not even be contiguous. In either of these cases, however, each region 502 will have one epipolar offset associated with it.

In image 300*a* of FIG. 5, the centroid of a region 502*a* is a distance 506*a* to the right of the left edge of image 300*a*. In image 300*b*, the corresponding region 502*b* is located a distance 506*b* to the right of the left edge of image 300*b*. The difference in locations is distance 506*a* minus distance 506*b*, or more generally:

$$\text{Offset}_{point} = X_A - X_B \qquad \text{Eq. 1}$$

where $X_A$ is the distance of a region 502*a* to the right of a characteristic point in image 300*a*, $X_B$ is the distance of the corresponding region 502*b* to the right of the characteristic point in image 300*b*, and $\text{Offset}_{point}$ is the epipolar offset of the region 502 in images 300. If distance 320 between the right and left vantage points 306 is $\text{Offset}_{vantage}$, and distance 318 between vantage points 306 and image plane 308 is $\text{Depth}_{image}$, then the following relation gives $\text{Depth}_{point}$, the perpendicular distance 316 from vantage points 306 to a point 304 represented by region 502:

$$\text{Depth}_{point} = \frac{\text{Depth}_{image} * \text{Offset}_{vantage}}{\text{Offset}_{point}} \qquad \text{Eq. 2}$$

From Equation 2, the depth 316 of the actual point 304 can be determined. To make apparent point 404 appear at a different apparent depth 416 requires changing $\text{Offset}_{point}$ by altering either distance 506*a*, distance 506*b*, or both. The new apparent depth 416 can be explicitly determined by the system, by the user, or it can be a function of the initial apparent depth 416. Other methods of determining the new apparent depth 416 will be apparent to those skilled in the art.

Once it is determined how much distance 506*a* or distance 506*b* is to be changed, it is a simple matter to move a region 502 of an image 300 to a new location, replacing the previous region 502 of the image 300 with either a neutral color or a background pattern. Alternately, the background surrounding the original position of region 502 can be extended into the vacant space. Region 502 is moved in at least one of images 300, in order to produce the desired change in distance 506.

By changing both distance 506*a* and distance 506*b*, an apparent point 404 can be made to appear at a different apparent depth 416, but at the same location along the epipolar axis 514. Also, the apparent point 404 can be made to appear at different elevations, by moving both regions 502 in the vertical direction.

The newly created set of images 300 are stored in output image memory 606 by CPU 602. From output image memory 606, the images 300 may be accessed for stereoscopic viewing.

The above description is included to illustrate the operation of an exemplary embodiment and is not meant to limit the scope of the invention. The scope of the invention is to be limited only by the following claims. From the above description, many variations will be apparent to one skilled in the art that would be encompassed by the spirit and scope of the present invention.

What is claimed is:

1. A computer implemented method for changing the apparent depth of at least one apparent point represented in a first image and a second image, which first image and second image are members of a stereoscopic set of images, each of the first image and the second image having a vantage point associated therewith, the method comprising the steps of:

identifying in the first image a first region smaller than the first image, which first region represents an apparent point;

identifying in the second image smaller than the second image a second region, which second region represents the apparent point;

determining a first epipolar offset, where the first epipolar offset is the difference in an epipolar direction between the location of the second region relative to a characteristic point of the second image and the location of the first region relative to a characteristic point of the first image, which epipolar direction is parallel to a vector from the vantage point of the first image to the vantage point of the second image; and changing the location of at least one of the first region and the second region such that, after changing, the first region and the second region define a second epipolar offset, which second epipolar offset is the difference in the epipolar direction between the location of the second region relative to the characteristic point of the second image and the location of the first region relative to the characteristic point of the first image, the change of location being selected such that the second epipolar offset is a desired value.

2. The method of claim 1, wherein the relation of the characteristic point of the first image to the first image is the same as the relation of the characteristic point of the second image to the second image.

3. The method of claim 1, wherein the desired value of the second epipolar offset is the product of the first epipolar offset multiplied by a predetermined constant.

4. The method of claim 1, wherein the desired value of the second epipolar offset is the product of the first epipolar offset multiplied by a constant which is selected by a user.

5. The method of claim 1, wherein the desired value for the second epipolar offset is determined with reference to the first epipolar offset.

6. The method of claim 5, wherein the desired value for the second epipolar offset is determined with reference to the distance in the epipolar direction between the vantage point of the first image and the vantage point of the second image.

7. The method of claim 1, wherein one of the first image and the second image is a scanned photograph of a physical scene.

8. The method of claim 1, wherein one of the first image and the second image is an image of a physical scene which has been captured in digital form.

9. The method of claim 1, wherein one of the first image and the second image is a computer generated image.

10. The method of claim 1, wherein one of the first image and the second image is a moving image.

11. The method of claim 1, wherein changing the position of at least one of the first region and the second region comprises changing the position of the first region and the second region such that the apparent location of the apparent point is not changed in the epipolar direction.

12. A computer apparatus comprising:

a central processing unit (CPU);

an image memory coupled to the CPU, for storing a first image of an apparent point and a second image of the apparent point, which first image and second image are members of a stereoscopic set of images, each of the first image and the second image having a vantage point associated therewith; and a program memory coupled to the CPU, for storing an array of instructions, which instructions, when executed by the CPU, cause the CPU to:

identify in the first image a first region, smaller than the first image which first region represents the apparent point;

identify in the second image a second region smaller than the second image, which second region represents the apparent point;

determine a first epipolar offset, where the first epipolar offset is the difference in an epipolar direction between the location of the second region relative to a characteristic point of the second image and the location of the first region relative to a characteristic point of the first image, which epipolar direction is parallel to a vector from the vantage point of the first image to the vantage point of the second image; and change the location of at least one of the first region and the second region such that, after changing, the first region and the second region define a second epipolar offset, which second epipolar offset is the difference in the epipolar direction between the location of the second region relative to the characteristic point of the second image and the location of the first region relative to the characteristic point of the first image, the change of location being selected such that the second epipolar offset is a desired value.

13. The apparatus of claim 12, wherein the relation of the characteristic point of the first image to the first image is the same as the relation of the characteristic point of the second image to the second image.

14. The apparatus of claim 12, wherein the desired value of the second epipolar offset is the product of the first epipolar offset multiplied by a predetermined constant.

15. The apparatus of claim 12, wherein the desired value for the second epipolar offset is determined with reference to the first epipolar offset.

16. The apparatus of claim 15, wherein the desired value for the second epipolar offset is determined with reference to the distance in the epipolar direction between the vantage point of the first image and the vantage point of the second image.

17. The apparatus of claim 12, wherein one of the first image and the second image is a moving image.

18. The apparatus of claim 12, wherein changing the position of at least one of the first region and the second region comprises changing the position of the first region and the second region such that the apparent location of the point in the epipolar direction is not changed.

19. A computer readable medium containing a computer program for changing the apparent location of at least one apparent point represented in a first image and a second image, which first image and second image are members of a stereoscopic set of images, each of the first image and the second image having a vantage point associated therewith, the changing of the apparent location of the apparent point performed by a method comprising the steps of:

identifying in the first image a first region smaller than the first image, which first region represents an apparent point;

identifying in the second image a second region smaller than the second image, which second region represents the apparent point;

determining a first epipolar offset, where the first epipolar offset is the difference in an epipolar direction between the location of the second region relative to a characteristic point of the second image and the location of the first region relative to a characteristic point of the first image, which epipolar direction is parallel to a vector from the vantage point of the first image to the vantage point of the second image; and changing the location of at least one of the first region and the second region such that, after changing, the first region and the second region define a second epipolar offset, which second epipolar offset is the difference in the epipolar direction between the location of the second region relative to the characteristic point of the second image and the location of the first region relative to the characteristic point of the first image, the change of location being selected such that the second epipolar offset is a desired value.

20. The computer readable medium of claim 19, wherein the relation of the characteristic point of the first image to the first image is the same as the relation of the characteristic point of the second image to the second image.

* * * * *

UNITED STATES PATENT AND TRADEMARK OFFICE
CERTIFICATE OF CORRECTION

PATENT NO. : 6,160,909

DATED : December 12, 2000

INVENTOR : Roger D. Melen

It is certified that error appears in the above-identified patent and that said Letters Patent is hereby corrected as shown below:

In column 6, line 17, after "identifying in the second image" insert --a second region--.

In column 6, line 18, after "image" delete "a second region".

Signed and Sealed this

Twenty-ninth Day of May, 2001

*Attest:*

NICHOLAS P. GODICI

*Attesting Officer*     *Acting Director of the United States Patent and Trademark Office*